US012619803B2

(12) United States Patent
Lu et al.

(10) Patent No.: US 12,619,803 B2
(45) Date of Patent: May 5, 2026

(54) METHOD AND SYSTEM FOR CALCULATING WATER-LAND-FORAGE-LIVESTOCK BALANCE IN FAMILY PASTURE BY TAKING FORAGE QUALITY INTO ACCOUNT

(71) Applicant: Institute of Water Resources for Pastoral Area, MWR, Hohhot (CN)

(72) Inventors: Haiyuan Lu, Hohhot (CN); Heping Li, Hohhot (CN); Jun Wang, Hohhot (CN); Hexiang Zheng, Hohhot (CN); Xuesong Cao, Hohhot (CN); Changfu Tong, Hohhot (CN); Bater Bai, Hohhot (CN); Jiabin Wu, Hohhot (CN); Zhiwei Ma, Hohhot (CN); Shanli Yang, Hohhot (CN); Morigen, Hohhot (CN)

(73) Assignee: INSTITUTE OF WATER RESOURCES FOR PASTORAL AREA, MWR, Hohhot (CN)

( * ) Notice: Subject to any disclaimer, the term of this patent is extended or adjusted under 35 U.S.C. 154(b) by 870 days.

(21) Appl. No.: 17/968,531

(22) Filed: Oct. 18, 2022

(65) Prior Publication Data

US 2023/0367925 A1 Nov. 16, 2023

(30) Foreign Application Priority Data

May 11, 2022 (CN) .......................... 202210514643.2

(51) Int. Cl.
| | |
|---|---|
| *G06F 30/20* | (2020.01) |
| *G06Q 50/02* | (2012.01) |
| *G06F 111/10* | (2020.01) |

(52) U.S. Cl.
CPC ............. *G06F 30/20* (2020.01); *G06Q 50/02* (2013.01); *G06F 2111/10* (2020.01)

(58) Field of Classification Search
CPC ..... G06F 30/20; G06F 2111/10; G06Q 50/02; G06Q 10/0631; G06Q 50/06; Y02A 40/70
See application file for complete search history.

(56) References Cited

FOREIGN PATENT DOCUMENTS

| | | | | |
|---|---|---|---|---|
| CN | 104956871 A | * | 10/2015 | ............... A01G 1/00 |
| CN | 106372740 A | * | 2/2017 | ............... G06N 3/12 |

OTHER PUBLICATIONS

Lu, Haiyuan, et al. "Optimal water and land resource allocation in pastoral areas based on a water-land forage-livestock balance: a case study of Otog Front Banner, Inner Mongolia, China." Environmental Science and Pollution Research 27.10 (2020): 10328-10341. (Year: 2020).*

(Continued)

*Primary Examiner* — Chuen-Meei Gan
(74) *Attorney, Agent, or Firm* — HOWARD M COHN and Associates, LLC

(57) ABSTRACT

The present disclosure provides a method and system for calculating water-land-forage-livestock balance in a family pasture by taking forage quality into account. The method takes a family pasture as a calculation unit and starts from a water circulation process, various types of groundwater recharges of the family pasture are calculated, and an available groundwater quantity is calculated by using an exploitable coefficient method, and undergoes water-land balance calculation with an irrigation water demand and a drinking water demand of people and livestock; and total digestible nutrients of various types of forage are used to convert each type of forage into standard hay for forage-livestock balance calculation, so as to determine a maximum supportable planting area of irrigated artificial grasslands (Continued)

and a maximum supportable quantity of livestock raised in the family pasture.

12 Claims, 2 Drawing Sheets

(56)                    References Cited

OTHER PUBLICATIONS

Qin, Lin, et al. "Research on Livestock Carrying Capacity of Arid Pastoral Areas Based on Dynamic Water-Forage-Livestock Balance in OtogBanner, China." Water 12.9 (2020): 2539. (Year: 2020).*
Lu, Haiyuan, et al. "Water and land resources allocation model of pastoral area based on grassland ecological conservation." Transactions of the Chinese Society of Agricultural Engineering 32.23 (2016): 123-130. (Year: 2016).*

* cited by examiner

METHOD AND SYSTEM FOR CALCULATING WATER-LAND-FORAGE-LIVESTOCK BALANCE IN FAMILY PASTURE BY TAKING FORAGE QUALITY INTO ACCOUNT

CROSS REFERENCE TO RELATED APPLICATION

This patent application claims the benefit and priority of Chinese Patent Application No. 202210514643.2, filed on May 11, 2022, the disclosure of which is incorporated by reference herein in its entirety as part of the present application.

TECHNICAL FIELD

The present disclosure relates to the technical field of mathematical model calculation, and in particular, to a method and system for calculating water-land-forage-livestock balance in a family pasture by taking forage quality into account.

BACKGROUND ART

At present, water resources evaluation is mostly performed by administrative units or water resources divisions to determine a quantity of regional water resources or a quantity of available water resources, and previous calculation of water-land-forage-livestock balance systems is mostly performed on the scale of administrative units (counties, towns, and villages) or water resources divisions, and mostly based on regional control. As a result, it is difficult to determine a quantity of available water resources in terms of field management of, e.g., family pasture units. Especially for family pastures that use groundwater as a water source, how to determine a proper quantity of irrigated artificial grasslands that may be developed and a quantity of livestock that may be raised for each household is particularly important for rational development and utilization of water resources and protection of ecological security of grasslands. In addition, in the past, the quantity of livestock raised was determined mostly based on grassland productivity (forage yield), but the forage yield often took only the quantity of forage into account, ignoring quality (nutritional value) differences among various types of forage, resulting in a waste of the forage or forage-livestock imbalance in actual practice.

Therefore, how to provide a method and system for calculating water-land-forage-livestock balance in a family pasture by taking forage quality into account, which can determine a maximum supportable planting area of irrigated artificial grasslands and a maximum supportable quantity of livestock raised in a family pasture, is a technical problem that needs to be resolved urgently by a person skilled in the art.

SUMMARY

In view of the foregoing research status and existing problems, the present disclosure provides a method and system for calculating water-land-forage-livestock balance in a family pasture by taking forage quality into account, specifically as follows.

The present disclosure first provides a method for calculating water-land-forage-livestock balance in a family pasture by taking forage quality into account, including the following steps:

S1: constructing a family pasture available-groundwater-supply equation and a family pasture water demand quantity equation based on area parameters of various irrigated artificial grasslands and a quantity of livestock raised;

S2: determining a water-land balance calculation equation based on an equality constraint condition between the family pasture available-groundwater-supply equation and the family pasture water demand quantity equation;

S3: converting various grasslands into standard hay by using total digestible nutrients of forage of various grasslands, obtaining a yield of the standard hay of the various grasslands, and constructing an available-forage-quantity equation and a forage demand quantity equation based on the yield of the standard hay of the various grasslands, the area parameters of various irrigated artificial grasslands, and the quantity of livestock raised;

S4: determining a forage-livestock balance calculation equation based on an equality constraint condition between the available-forage-quantity equation and the forage demand quantity equation; and S5: obtaining the area parameters of various irrigated artificial grasslands and the quantity of livestock raised by solving the simultaneous water-land balance calculation equation and forage-livestock balance calculation equation.

Preferably, the family pasture available-groundwater-supply equation is:

$$W_S = R \times \beta$$

$$R = 10^3 A \times P \times \alpha_p + \sum_i A_i \times m_i \times \alpha_i$$

where R is family pasture groundwater recharge (m³); β is an exploitable coefficient; A is a family pasture land area (km²); P is rainfall (mm); $\alpha_p$ is an infiltration recharge coefficient of rainfall; $A_i$ is an area (hm²) of various grasslands, including irrigated artificial grasslands and natural grasslands; $m_i$ is an irrigation quota (m³/hm²) for various grasslands, and the natural grasslands are not irrigated, and have a quota of 0; and $\alpha_i$ is an irrigation infiltration recharge coefficient; and the family pasture water demand quantity equation is:

$$W_R = R \times m_r + A_i \times m_i + L \times m_l$$

where $W_R$ is a water demand quantity (m³); R is a quantity of people in the family pasture; $m_r$ is a per capita drinking water quota (m³/person); L is a to-be-determined quantity of livestock raised (in unit of sheep); and $m_l$ is a drinking water quota for livestock (m³/sheep).

Preferably, the water-land balance calculation equation is: $W_S = W_R$.

Preferably, the converting various grasslands into standard hay by using total digestible nutrients of forage of various grasslands includes:

$$y_{si} = y_i \times \eta_i$$

-continued $$\eta_i = \frac{TDN_i}{TDN_s}$$

where $y_{si}$ is a standard hay conversion quantity (kg/hm²) of various grasslands;

$y_i$ is a forage yield (kg/hm²) of various grasslands;

$\eta_i$ is a standard hay conversion coefficient;

$TDN_i$ is total digestible nutrients (%) of forage of various grasslands; and $TDN_s$ is total digestible nutrients (%) of temperate steppe forage which is mainly gramineous forage grass.

Preferably, a calculation equation for the total digestible nutrients is:

$$TDN=81.38+0.36\ CP-0.77\ ADF$$

where TDN is the total digestible nutrients (%), including $TDN_i$ and $TDN_s$; CP is a content (%) of a crude protein in the forage; and ADF is a content (%) of an acid detergent fiber in the forage.

Preferably, the available-forage-quantity equation is determined by using the following formula:

$$F_S = \sum_i A_i \times y_{si} \times d_i$$

where $F_S$ is an available forage quantity (kg); $A_i$ is an area (hm²) of various grasslands; $d_i$ is utilization of artificial forage; $d_j$ is utilization of natural grasslands; and the forage demand quantity equation is:

$$F_R=L\times D$$

where $F_R$ is a forage demand quantity (kg); L is a quantity of livestock raised; and D is a forage quota for livestock raising.

Preferably, the forage-livestock balance calculation equation is: $F_S=F_R$.

The present disclosure further provides a system for calculating water-land-forage-livestock balance in a family pasture according to the above method for calculating eater-land-forage-livestock balance in a family pasture by taking forage quality into account, including:

a family pasture available-groundwater-supply construction module configured to construct a family pasture available-groundwater-supply equation based on area parameters of various irrigated artificial grasslands;

a family pasture water demand quantity construction module configured to construct a family pasture water demand quantity equation based on the area parameters of various irrigated artificial grasslands and a quantity of livestock raised;

a water-land balance solution determining module configured to determine a water-land balance calculation equation based on an equality constraint condition between the family pasture available-groundwater-supply equation and the family pasture water demand quantity equation;

a hay yield conversion module configured to convert various grasslands into standard hay by using total digestible nutrients of forage of various grasslands, and obtain a yield of the standard hay of the various grasslands;

an available-forage-quantity construction module configured to construct an available-forage-quantity equation based on the yield of the standard hay of the various grasslands and the area parameters of various irrigated artificial grasslands;

a forage demand quantity construction module configured to construct a forage demand quantity equation based on the quantity of livestock raised;

a forage-livestock balance solution determining module configured to determine a forage-livestock balance calculation equation based on an equality constraint condition between the available-forage-quantity equation and the forage demand quantity equation; and a water-land-forage-livestock balance solution solving module configured to obtain the area parameters of various irrigated artificial grasslands and the quantity of livestock raised by solving the simultaneous water-land balance calculation equation and forage-livestock balance calculation equation.

Compared with the prior art, the present disclosure has the following beneficial effects:

In the present disclosure, a maximum support capacity of water resources for irrigated artificial grasslands and livestock raising is obtained based on a condition that the water demand is equal to the available water quantity. In addition, the bearing capacity of the forage yield of irrigated artificial grasslands and natural grasslands for livestock is taken into account. When forage-livestock balance is considered, the forage is converted into hay of a uniform standard based on differences in quality and nutritional components between different types of irrigated forage and different types of natural grassland, and then the forage-livestock balance is considered, Therefore, the maximum scale that the family pasture can bear under a condition of by taking forage quality into account is achieved by calculating the maximum planting scale of the irrigated artificial grasslands and the maximum scale of the livestock raised.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description merely show the embodiments of the present disclosure, and a person of ordinary skill in the art may still derive other accompanying drawings from the provided accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
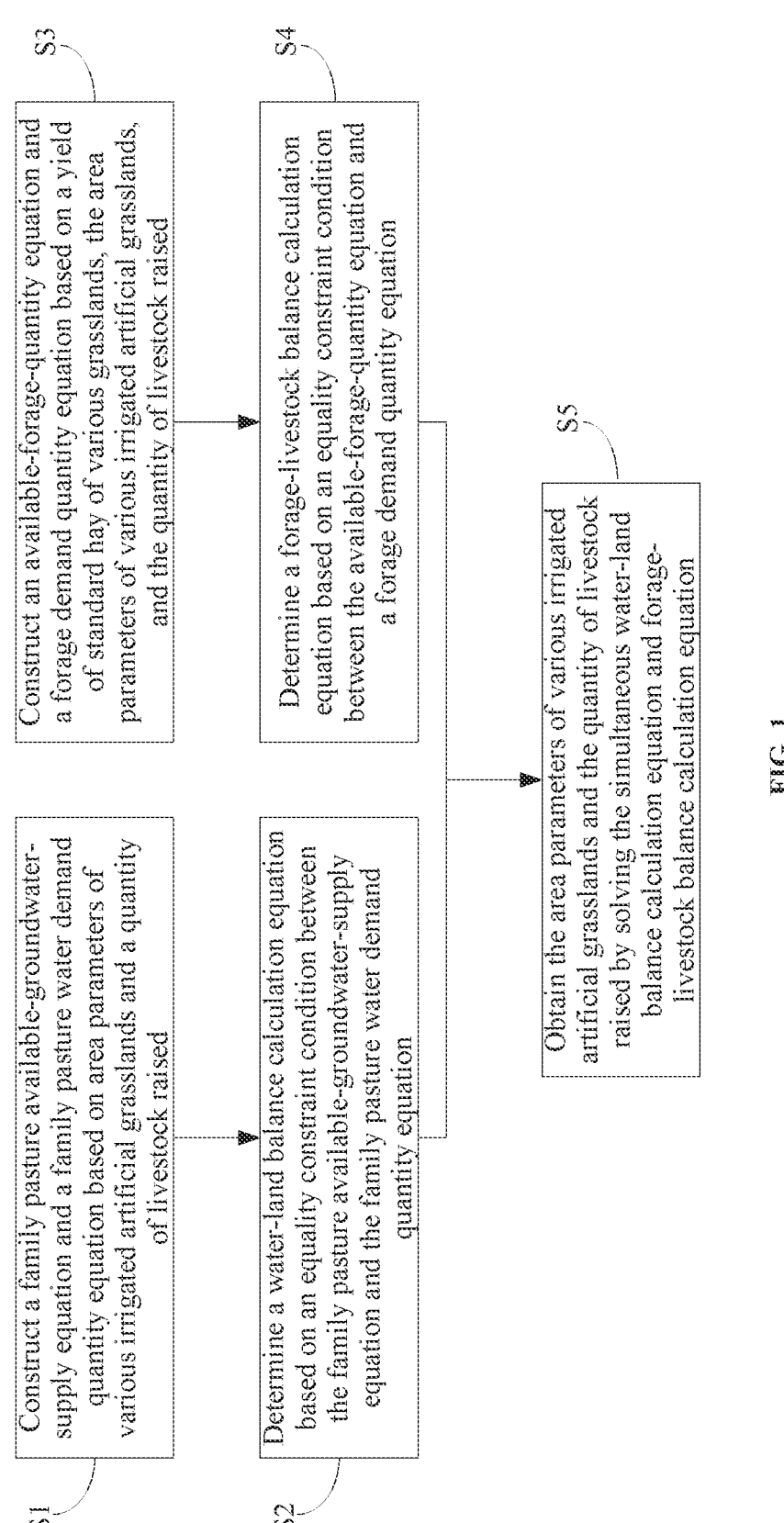
FIG. 1 is a flowchart of a method for calculating water-land-forage-livestock balance in a family pasture by taking forage quality into account according to an embodiment of the present disclosure.
Figure 2:
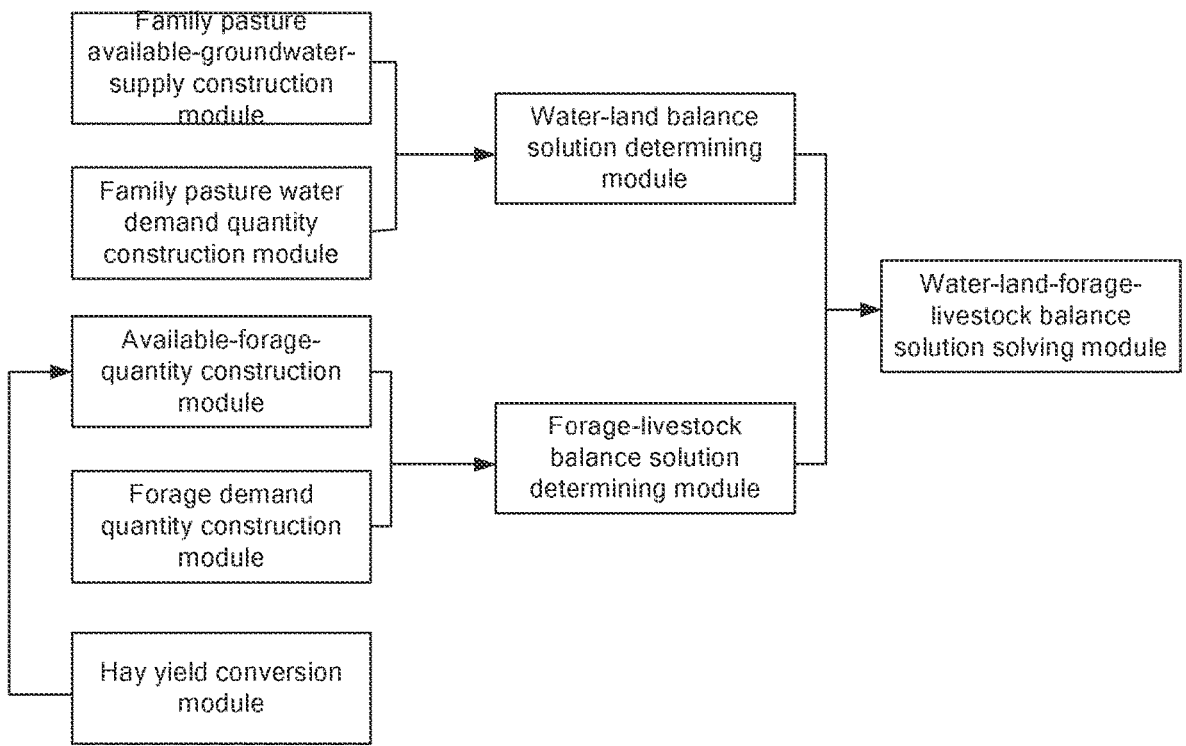
FIG. 2 is a structural block diagram of a system for calculating water-land-forage-livestock balance in a family pasture by taking forage quality into account according to an embodiment of the present disclosure.

Referring to FIG. 1, in this embodiment of the present disclosure, a family pasture is taken as a calculation unit, starting from a water circulation process, various types of groundwater recharges of the family pasture are calculated, and an available groundwater quantity is calculated by using an exploitable coefficient method, and undergoes water-land balance calculation with an irrigation water demand and a drinking water demand of people and livestock; and total digestible nutrients of various types of forage are used to convert each type of forage into standard hay for forage-livestock balance calculation, so as to determine a maximum supportable planting area of irrigated artificial grasslands and a maximum supportable quantity of livestock raised in the family pasture.

According to a first aspect of an embodiment of the present disclosure, a method for calculating water-land-forage-livestock balance in a family pasture by taking forage quality into account is disclosed, including the following specific calculation steps.

S1: Construct a family pasture available-groundwater-supply equation and a family pasture water demand quantity equation based on area parameters of various irrigated artificial grasslands and a quantity of livestock raised.

1. Determining of Available Family Pasture Groundwater Supply

As the family pasture as a calculation unit is generally relatively small, the family pasture substantially takes groundwater as a water source. A water circulation process is analyzed based on an area of land at which the family pasture is located, to analyze a groundwater recharge and discharge process. Recharge sources of groundwater mainly include rainfall infiltration recharge, lateral recharge, and back-irrigation recharge from groundwater irrigation, and the discharge mainly includes phreatic evaporation, artificial exploitation, lateral outflow, etc. Because an analysis unit is relatively small, the groundwater level is substantially the same. The lateral inflow of groundwater is considered consistent with the lateral outflow, so this part of recharge and discharge may be ignored. The recharge of groundwater in the family pasture as the unit mainly includes rainfall infiltration recharge and back-irrigation recharge from groundwater irrigation. The calculation formula of available family pasture groundwater supply is as follows:

$$W_S = R \times \beta \text{ and} \tag{1}$$

$$R = 10^3 A \times P \times \alpha_p + \sum_i A_i \times m_i \times \alpha_i \tag{2}$$

where R is family pasture groundwater recharge (m³);
β is an exploitable coefficient;
A is a family pasture land area (km²);
P is rainfall (mm), which is generally average rainfall for many years;
$\alpha_p$ is an infiltration recharge coefficient of rainfall, which is taken based on a local lithologic condition;
$A_i$ is an area (hm²) of various grasslands, including irrigated artificial grasslands and natural grasslands;
$m_i$ is an irrigation quota (m³/hm²) for various artificial grasslands, the irrigation quota for the artificial grasslands is determined by inquiring recommended values in the water quota of various industries or based on irrigation tests of various artificial grasslands, and the natural grasslands are not irrigated, and have a quota of 0 m³/hm²; and
$\alpha_i$ is an irrigation infiltration recharge coefficient, which may be comprehensive determined based on an irrigation form used, the irrigation quota, and a groundwater depth.

2. Determining of a Family Pasture Water Demand

The family pasture water demand mainly includes a domestic drinking water demand, a water demand for artificial steppe irrigation, and a drinking water demand for livestock, with a calculation formula as follows:

$$W_R = R \times m_r + A_i \times m_i + L \times m_l \tag{3}$$

where $W_R$ is a water demand quantity (m³);
R is a quantity of people in the family pasture;
$m_r$ is a per capita drinking water quota (m³/person), which may be taken as 60-90 L/person/d based on a living condition, i.e., 21.9-32.9 m³/person;
$A_i$ and $m_i$ are the same as those of formula (2);
L is a to-be-determined quantity of livestock raised (in unit of sheep); and
$m_l$ is a drinking water quota for livestock (m³/sheep), which may be taken as 8 L/sheep/d, i.e., 2.92 m³/sheep.

S2: Determine a water-land balance calculation equation based on an equality constraint condition between the family pasture available-groundwater-supply equation and the family pasture water demand quantity equation.

The water demand of the family pasture needs to be verified based on the available groundwater supply. When the water demand is greater than the available water supply, it means that the water demand is excessively high, and needs to be reduced reasonably (mainly by adjusting the planting area of irrigated artificial grasslands, adjusting a planting ratio of crops with different water consumption requirements, or reducing an area of irrigated artificial grasslands). When the water demand is equal to the available water supply, it means that the supply and demand are balanced, and irrigated artificial grasslands and livestock raised reach the upper limit in the perspective of water resources. When the water demand is less than the available water supply, there is moderate development space for irrigated grasslands and livestock raised in the perspective of water resources, but maintaining the current level is more conducive to water conservation and ecological protection.

A maximum support capacity of water resources for irrigated artificial grasslands and livestock raising is obtained based on a condition that the water demand is equal to the available water quantity, with a calculation formula as follows:

$$W_S = W_R \tag{4}$$

$$\tag{5}$$
i.e., $$\left(A \times P \times \alpha_p + \sum_i A_i \times m_i \times \alpha_i\right) \times \beta = A_i \times m_i + L \times m_l + R \times m_r$$

where $A_i$ and L are unknown, and are variables to be solved in the calculation of this embodiment.

S3: Convert various grasslands into standard hay by using total digestible nutrients of forage of various grasslands, obtain a yield of the standard hay of the various grasslands, and construct an available-forage-quantity equation and a forage demand quantity equation based on the yield of the standard hay of the various grasslands, the area parameters of various irrigated artificial grasslands, and the quantity of livestock raised.

When the bearing capacity of water resources for irrigated artificial grasslands and livestock are considered, the bearing capacity of the forage yield of irrigated artificial grasslands and natural grasslands for livestock needs to be considered, that is, the forage-livestock balance needs to be considered. Different types of irrigated forage and different types of natural grasslands are different in quality and nutrient composition in addition to the yield. For example, mountain meadows, gramineous meadows, alfalfa, silage corn, oats, forage maize kernels, etc. all contain different nutritional components. In the past, only the balance in forage quantity was considered, but the balance in quality was not considered. In the present disclosure, the forage is first converted into hay of a uniform standard, and then the forage-livestock balance is considered.

1. Conversion to Standard Hay by Taking Forage Quality into Account

Temperate steppe forage which is mainly gramineous forage grass is taken as the standard, and other forage is converted into hay of a uniform standard, not only considering the balance in forage quantity, but also considering the quality difference between forage in forage-livestock balance. Various forage of natural grasslands and artificial forage are converted into standard hay by using the total digestible nutrients of various forage, with calculation formulas as follows:

$$y_{si} = y_i \times \eta_i \tag{6}$$

$$\eta_i = \frac{TDN_i}{TDN_s} \text{ and} \tag{7}$$

$$TDN = 81.38 + 0.36CP - 0.77ADF \tag{8}$$

where $y_{si}$ is a standard hay conversion quantity (kg/hm$^2$) of various grasslands;
$y_i$ is a forage yield (kg/hm$^2$) of various grasslands, the forage yield of grasslands may be measured by using a quadrat method, weighted average calculation is performed on a plurality of quadrats, and grassland monitoring data of the forestry and grassland department may be queried for natural grassland;
$\eta_i$ is a standard hay conversion coefficient,
TDN is total digestible nutrients (%);
$TDN_i$ is total digestible nutrients (%) of forage of various grasslands;
$TDN_s$ is total digestible nutrients (%) of temperate steppe forage which is mainly gramineous forage grass;
CP is a content (%) of a crude protein in the forage; and
ADF is a content (%) of an acid detergent fiber in the forage.

2. Calculation of an Available Forage Quantity

After the conversion to standard hay by taking forage quality into account, an available family pasture forage quantity is calculated based on an area of various artificial grasslands and natural grasslands, with a calculation formula as follows:

$$F_S = \sum_i A_i \times y_{si} \times d_i \tag{9}$$

where $F_S$ is an available forage quantity (kg);
$A_i$ is an area (hm$^2$) of various grasslands, which is the same as that of formula (2);
$y_{si}$ has the same meaning as that of -formula (6), and is a standard hay yield (kg/hm$^2$) of various grasslands;
$d_i$ is utilization of artificial forage, and the utilization of various types of artificial forage is generally 90%-95%; and
$d_j$ is utilization of natural grasslands, the utilization of different types of grasslands is 5%-65%, the utilization of alpine desert type grasslands is relatively low, and the utilization of tropical tussock/shrub tussock grasslands may reach 65%. Grassland census data may be queried for the reasonable utilization of different grasslands.

3. Calculation of a Forage Demand

The forage demand for livestock raising is determined based on the quantity of livestock raised, and is determined by multiplying a livestock raising quota by the quantity of livestock raised, with a calculation formula as follows:

$$F_R = L \times D \tag{10}$$

where $F_R$ a forage demand quantity (kg);
L is the same as the quantity of livestock raised in formula (3), needs to be converted into standard sheep units, and generally can be referred to;
D is a forage quota for livestock raising, is generally 1.8 kg/day/sheep, which is considered on a year basis of 365 days, i.e., 657 kg/sheep.

S4: Determine a forage-livestock balance calculation equation based on an equality constraint condition between the available-forage-quantity equation and the forage demand quantity equation.

The same as water-land balance analysis, the livestock raising forage demand of the family pasture (the quantity of livestock raised is verified) also needs to be verified based on the available forage quantity. When the forage demand is greater than the available forage quantity, it means that the forage demand is excessively high, and the forage demand needs to be reasonably reduced (the livestock raising scale needs to be reduced mainly). When the forage demand is equal to the available forage quantity, it means the forage and the livestock are balanced, and the livestock raised reaches the upper limit in the perspective of forage resources. When the forage demand is less than the available forage quantity, there is a moderate development space for livestock raising from the perspective of forage resources, but maintaining the current level is more conducive to ecological protection of natural grasslands.

A maximum support capacity of forage resources for livestock raising is obtained based on a condition that the forage demand is equal to the available forage quantity, with a calculation formula as follows:

$$F_S = F_R, \tag{11}$$

-continued $$i.e., \sum_i A_i \times y_{si} \times d_i \times H_i = L \times D \qquad (12)$$

S5: Obtain the area parameters of various irrigated artificial grasslands and the quantity of livestock raised by solving the simultaneous water-land balance calculation equation and forage-livestock balance calculation equation.

Equation (5) represents water-land balance, and equation (12) represents forage-livestock balance. The two equations involve dependent variables of the area of the irrigated artificial grasslands and the quantity of livestock raised. The maximum planting scale of the irrigated artificial grasslands and the maximum scale of livestock raised under the condition of water-land-forage-livestock balance are determined by joint solution and calculation.

According to a second aspect of an embodiment of the present disclosure, a system for calculating water-land-forage-livestock balance in a family pasture according to the method for calculating water-land-forage-livestock balance in a family pasture by taking forage quality into account according to the first aspect is further disclosed, including:

a family pasture available-groundwater-supply construction module configured to construct a family pasture available-groundwater-supply equation based on area parameters of various irrigated artificial grasslands;

a family pasture water demand quantity construction module configured to construct a family pasture water demand quantity equation based on the area parameters of various irrigated artificial grasslands and a quantity of livestock raised;

a water-land balance solution determining module configured to determine a water-land balance calculation equation based on an equality constraint condition between the family pasture available-groundwater-supply equation and the family pasture water demand quantity equation;

a hay yield conversion module configured to convert various grasslands into standard hay by using total digestible nutrients of forage of various grasslands, and obtain a yield of the standard hay of the various grasslands;

an available-forage-quantity construction module configured to construct an available-forage-quantity equation based on the yield of the standard hay of the various grasslands and the area parameters of various irrigated artificial grasslands;

a forage demand quantity construction module configured to construct a forage demand quantity equation based on the quantity of livestock raised;

a forage-livestock balance solution determining module configured to determine a forage-livestock balance calculation equation based on an equality constraint condition between the available-forage-quantity equation and the forage demand quantity equation; and a water-land-forage-livestock balance solution solving module configured to obtain the area parameters of various irrigated artificial grasslands and the quantity of livestock raised by solving the simultaneous water-land balance calculation equation and forage-livestock balance calculation equation.

It should be understood that the modules included in the system for calculating water-land-forage-livestock balance in a family pasture by taking forage quality into account are only logical divisions based on the functions implemented by the system. In practical application, the foregoing modules may be superimposed or split. In addition, the functions implemented by the system for calculating water-land-forage-livestock balance in a family pasture by taking forage quality into account according to this embodiment are in a one-to-one correspondence with the method for calculating water-land-forage-livestock balance in a family pasture by taking forage quality into account according to the foregoing embodiments. The more detailed processing flow implemented by the system has been described in detail in Embodiment 1 of the foregoing method. Details are not described herein again.

The foregoing method and system according to this embodiment can be used to evaluate a current situation of water-land-forage-livestock balance.

The calculated maximum planting scale of the irrigated artificial grasslands and the calculated maximum scale of the livestock raised are the maximum scale that the family pasture can bear under a condition of by taking forage quality into account. The balance of actual irrigated artificial grasslands planted and the livestock raised is evaluated by using the calculation results.

(1) When the area of the actual irrigated artificial grasslands exceeds the calculated bearing area, the irrigated area needs to be reduced to the bearing area; in this case, when the actual quantity of livestock raised is greater than the quantity of livestock that can be supported, the quantity of livestock raised needs to be reduced to the quantity of livestock that can be carried; and if the actual quantity of livestock raised is less than the quantity of livestock that can be supported, the livestock raised can be appropriately increased or the existing quantity of livestock raised may be maintained to protect the natural grasslands.

(2) When the actual development scale of the irrigated artificial grasslands is less than the bearing capacity, the planting area may be appropriately increased based on the policy requirements. If the policy does not allow an increase in planting area, a suitable livestock raising scale under this planting condition needs to be verified based on calculation formulas (6)-(12) of the forage-livestock balance and the actual area of the irrigated artificial grasslands, to re-evaluate the forage-livestock balance.

A specific application example of the embodiments of the present disclosure is given below.

The method was applied to a typical herdsman household with a population of 4, and the per capita domestic water quota is 80 L/person/d, i.e., 32.9 m³/person and a land area of 2.96 km².

The herdsman household owns 273.3 hm² of natural grassland, and the grassland type is a temperate desert grassland. The average yield per hectare is 722.5 kg/hm², the grassland utilization is 54%, and the calculated standard hay conversion coefficient is 0.9.

There are 18.7 hm² of irrigated artificial grasslands, where there is 13.3 hm² of alfalfa under center pivot irrigation, with an irrigation quota of 3600 m³/m², three crops harvested every year, an average yield of 12000 kg/hm², a CP value of 20.15%, an ADF value of 30.89%, a TDN value of 64.85%, a calculated standard hay yield of 13440 kg/hm², and forage utilization of 95%; there is 3.3 hm² of forage maize under drip irrigation, with an irrigation quota of 3300 m³/hm², an average grain yield of 9750 kg/hm², a CP value of 9.88%, an ADF value of 4.54%, and a TDN value of 81.44%, a calculated standard hay yield of 13755 kg/hm², and forage utilization of 98%; there are 2 hm² of green oats under fixed sprinkler irrigation, with an irrigation quota of 2400 m³/hm², an average hay yield of 9000 kg/hm² (converted from fresh grass to hay), a CP value of 8.0%, an ADF value of 33.07%, a TDN value of 58.08%, a calculated standard hay yield of 9180 kg/hm$^2$, and forage utilization of 95%.

A groundwater type region is a plain region, which belongs to the third-level hydrogeological division of Mu Us Desert, has an average annual rainfall of 217 mm, a rainfall infiltration recharge coefficient of 0.12, and an irrigation infiltration recharge coefficient of 0.05 (at present; water-saving irrigation forms such as drip irrigation are used; and the irrigation infiltration recharge coefficient is relatively small). Groundwater exploitation conditions are relatively good, and the exploitable coefficient determined by a hydro-geological unit is 0.7.

At present, the quantity of livestock raised is 400 (standard sheep), and the livestock raising quota is 657 kg/sheep.

According to local forage planting habits, crops planted are substantially alfalfa, forage maize, and green oats. It is planned to first solve the suitable scale of irrigated artificial grasslands and the suitable scale of livestock raised based on a current planting ratio.

After calculation based on formulas (1)-(12), it is determined that the irrigated artificial grasslands have an area of 15.87 hm$^2$ (11.3 hm$^2$ of alfalfa, 2.83 hm$^2$ of forage maize, and 1.7 hm$^2$ of green oats), the quantity of livestock raised is 473, the rainfall infiltration recharge according to inter-mediate calculation is 76943 m$^3$, well irrigation return recharge is 2713 m$^3$, the available groundwater supply is 55760 m$^3$, the domestic water demand is 116.8 m$^3$, the water demand for livestock is 1381 m$^3$, and the irrigation quantity of irrigated artificial grassland is 54262 m$^3$; the standard hay yield of natural grasslands is 102619 kg, and the standard hay yield of artificial grasslands is 197778 kg.

The current irrigated artificial grassland covers an area of 18.7 hm$^2$, which exceeds the area of irrigated artificial grassland that can be supported by water resources. The current quantity of livestock raised is 400, which is less than the suitable quantity of livestock raised. The herdsman household needs to reduce the area of the irrigated artificial grasslands by 2.8 hm$^2$. At present; some forage is sold, so that local water resources are output in the form of virtual water. The quantity of livestock raised may be appropriately increased by 73, but the livestock may be raised based on the current quantity of livestock raised, to protect natural grass-lands.

In the example, solving is performed based on the current planting ratio of forage crops; and may be performed by adjusting the planting ratio of different forage crops based on the law, to form several comparison solutions. After a comprehensive comparison, the suitable area of irrigated artificial grasslands and the suitable quantity of livestock raised may be determined.

In addition, it should also be noted herein that the respective composite parts in the above system can be configured by software, firmware, hardwire or a combination thereof. Specific means or manners that can be used for the configu-ration will not be stated repeatedly herein since they are well-known to those skilled in the art. In case of implemen-tation by software or firmware, programs constituting the software are installed from a storage medium or a network to a computer (e.g. the universal computer 300 as shown in FIG. 3) having a dedicated hardware structure; the computer, when installed with various programs, can implement vari-ous functions and the like.

Figure 3:
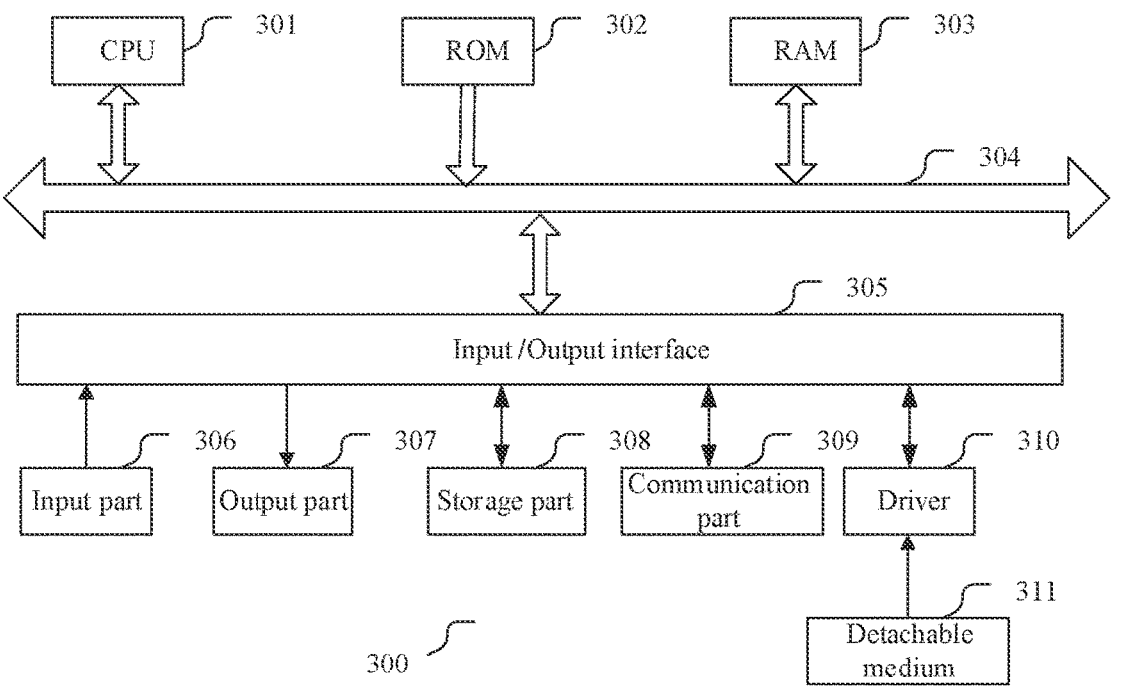
FIG. 3 is a schematic block diagram of a computer that can be used for implementing the method and the system according to the embodiments of the present disclosure.

FIG. 3 shows a schematic block diagram of a computer that can be used for implementing the method and the system according to the embodiments of the present disclo-sure.

In FIG. 3, a central processing unit (CPU) 301 executes various processing according to a program stored in a read-only memory (ROM) 302 or a program loaded from a storage part 308 to a random access memory (RAM) 303. In the RAM 303, data needed at the time of execution of various processing and the like by the CPU 301 is also stored according to requirements. The CPU 301, the ROM 302 and the RAM 303 are connected to each other via a bus 304. An input/output interface 305 is also connected to the bus 304.

The following components are connected to the input/output interface 305: an input part 306 (including a key-board, a mouse and the like); an output part 307 (including a display, such as a Cathode Ray Tube (CRT), a Liquid Crystal Display (LCD) and the like, as well as a loudspeaker and the like); the storage part 308 (including a hard disc and the like); and a communication part 309 (including a net-work interface card such as an LAN card, a modem and so on). The communication part 309 performs communication processing via a network such as the Internet. According to requirements, a driver 310 may also be connected to the input/output interface 305. A detachable medium 311 such as a magnetic disc, an optical disc, a magnetic optical disc, a semiconductor memory and the like may be installed on the driver 310 according to requirements, such that a com-puter program read therefrom is installed in the storage part 308 according to requirements.

In the case of carrying out the foregoing series of pro-cessing by software, programs constituting the software are installed from a network such as the Internet or a storage medium such as the detachable medium 311.

Those skilled in the art should appreciate that such a storage medium is not limited to the detachable medium 311 storing therein a program and distributed separately from the apparatus to provide the program to a user as shown in FIG. 3. Examples of the detachable medium 311 include a mag-netic disc (including floppy disc (registered trademark)), a compact disc (including compact disc read-only memory (CD-ROM) and digital versatile disc (DVD), a magneto optical disc (including mini disc (MD)(registered trade-mark)), and a semiconductor memory. Or, the storage medium may be hard discs and the like included in the ROM 302 and the storage part 308 in which programs are stored, and are distributed concurrently with the apparatus including them to users.

The present disclosure further proposes a program prod-uct storing therein a machine-readable instruction code that, when read and executed by a machine, can implement the aforesaid method according to the embodiment of the pres-ent disclosure.

Correspondingly, a storage medium for carrying the pro-gram product storing therein the machine-readable instruc-tion code is also included in the disclosure of the present disclosure. The storage medium includes but is not limited to a floppy disc, an optical disc, a magnetic optical disc, a memory card, a memory stick and the like.

The method and system for calculating water-land-forage-livestock balance in a family pasture by taking forage quality into account according to the present disclosure have been described in detail above, and specific examples are applied herein to illustrate the principle and implementations of the present disclosure. The descriptions of the foregoing embodiments are provided only to help understand the method and core idea of the present disclosure. In addition, for a person of ordinary skill in the art, changes may be made to the specific implementations and application scope based on the idea of the present disclosure. In conclusion, the content of this specification should not be construed as a limitation to the present disclosure.

Relational terms herein such as first and second are merely used to distinguish one entity or operation from another entity or operation without necessarily requiting or implying any actual such relationship or order between such entities or operations. In addition, terms "include", "comprise", or any other variations thereof are intended to cover a non-exclusive inclusion, so that a process, a method, an article, or a device including a series of elements not only includes those elements, but also includes other elements that are not explicitly listed, or also includes elements inherent to the process, the method, the article, or the device. Without further limitation, an element defined by the sentence "including a . . . " does not exclude the existence of another identical element in the process, method, article or device that includes the element.

What is claimed is:

1. A method for adjusting water-land-forage-livestock balance in a family pasture by taking forage quality into account, comprising:

S1: constructing a family pasture available-groundwater-supply equation and a family pasture water demand quantity equation based on area parameters of various irrigated artificial grasslands and a quantity of livestock raised;

S2: determining a water-land balance calculation equation based on an equality constraint condition between the family pasture available-groundwater-supply equation and the family pasture water demand quantity equation;

S3: converting various grasslands into standard hay by using total digestible nutrients of forage of various grasslands, obtaining a yield of the standard hay of the various grasslands, and constructing an available-forage-quantity equation and a forage demand quantity equation based on the yield of the standard hay of the various grasslands, the area parameters of various irrigated artificial grasslands, and the quantity of livestock raised;

S4: determining a forage-livestock balance calculation equation based on an equality constraint condition between the available-forage-quantity equation and the forage demand quantity equation;

S5: obtaining the area parameters of various irrigated artificial grasslands and the quantity of livestock raised by solving the simultaneous water-land balance calculation equation and forage-livestock balance calculation equation to determine a maximum supportable planting area of irrigated artificial grasslands and a maximum supportable quantity of livestock raised in the family pasture; and adjusting an actual area of the irrigated artificial grasslands and an actual quantity of the livestock raised based on the maximum supportable planting area of the irrigated artificial grasslands and the maximum supportable quantity of the livestock raised in the family pasture;

wherein the converting various grasslands into standard hay by using total digestible nutrients of forage of various grasslands comprises:

$$y_{si} = y_i \times n_i$$

$$n_i = \frac{TDN_i}{TDN_s}$$

wherein $y_{si}$ is a standard hay conversion quantity (kg/hm$^2$) of various grasslands;

$y_i$ is a forage yield (kg/hm$^2$) of various grasslands;

$n_i$ is a standard hay conversion coefficient;

$TDN_i$ is total digestible nutrients (%) of forage of various grasslands; and $TDN_s$ is total digestible nutrients (%) of temperate steppe forage which is mainly gramineous forage grass.

2. The method for adjusting water-land-forage-livestock balance in a family pasture by taking forage quality into account according to claim 1, wherein the family pasture available-groundwater-supply equation is:

$$W_S = R \times \beta$$
$$R = 10^3 A \times P \times \alpha_p + \sum_i A_i \times m_i \times \alpha_i$$

wherein $W_s$ isd an available-groundwater-supply (m$^3$); $\beta$ is an exploitable coefficient; A is a family pasture land area (km$^2$); P is rainfall (mm); $\alpha_p$ is an infiltration recharge coefficient of rainfall; $A_i$ is an area (hm$^2$) of various grasslands, comprising irrigated artificial grasslands and natural grasslands; $m_i$ is an irrigation quota (m$^3$/hm$^2$) for various grasslands, and the natural grasslands are not irrigated, and have a quota of 0; and $\alpha_i$ is an irrigation infiltration recharge coefficient; and the family pasture water demand quantity equation is:

$$W_R = R \times m_r + A_i \times m_i + L \times m_l$$

wherein $W_R$ is a water demand quantity (m$^3$); R is a quantity of people in the family pasture; $m_r$ is a per capita drinking water quota (m$^3$/person); L is a to-be-determined quantity of livestock raised (in unit of sheep); and $m_l$ is a drinking water quota for livestock (m$^3$/sheep).

3. The method for adjusting water-land-forage-livestock balance in a family pasture by taking forage quality into account according to claim 2, wherein the water-land balance calculation equation is: $W_S = W_R$.

4. The method for adjusting water-land-forage-livestock balance in a family pasture by taking forage quality into account according to claim 1, wherein a calculation equation for the total digestible nutrients is:

$$TDN = 81.38 + 0.36\ CP - 0.77\ ADF$$

wherein TDN is the total digestible nutrients (%), comprising $TDN_i$ and $TDN_s$; CP is a content (%) of a crude protein in the forage; and ADF is a content (%) of an acid detergent fiber in the forage.

5. The method for adjusting water-land-forage-livestock balance in a family pasture by taking forage quality into account according to claim 1, wherein the available-forage-quantity equation is determined by using the following formula:

$$F_S = \sum_i A_i \times y_{si} \times d_i$$

wherein $F_S$ is an available forage quantity (kg); $A_i$ is an area (hm$^2$) of various grasslands; $d_i$ is utilization of artificial forage; $d_j$ is utilization of natural grasslands; and

15 the forage demand quantity equation is:

$$F_R = L \times D$$

wherein $F_R$ is a forage demand quantity (kg); L is a quantity of livestock raised; and D is a forage quota for livestock raising.

6. The method for adjusting water-land-forage-livestock balance in a family pasture by taking forage quality into account according to claim 5, wherein the forage-livestock balance calculation equation is: $F_S = F_R$.

7. A system for adjusting water-land-forage-livestock balance in a family pasture according to the method for adjusting water-land-forage-livestock balance in a family pasture by taking forage quality into account, comprising a processor and a memory storing program codes, wherein the processor performs the stored program codes to construct a family pasture available-groundwater-supply equation based on area parameters of various irrigated artificial grasslands;

construct a family pasture water demand quantity equation based on the area parameters of various irrigated artificial grasslands and a quantity of livestock raised;

determine a water-land balance calculation equation based on an equality constraint condition between the family pasture available-groundwater-supply equation and the family pasture water demand quantity equation;

convert various grasslands into standard hay by using total digestible nutrients of forage of various grasslands, and obtain a yield of the standard hay of the various grasslands;

construct an available-forage-quantity equation based on the yield of the standard hay of the various grasslands and the area parameters of various irrigated artificial grasslands;

construct a forage demand quantity equation based on the quantity of livestock raised;

determine a forage-livestock balance calculation equation based on an equality constraint condition between the available-forage-quantity equation and the forage demand quantity equation;

obtain the area parameters of various irrigated artificial grasslands and the quantity of livestock raised by solving the simultaneous water-land balance calculation equation and forage-livestock balance calculation equation to determine a maximum supportable planting area of irrigated artificial grasslands and a maximum supportable quantity of livestock raised in the family pasture; and adjust an actual area of the irrigated artificial grasslands and an actual quantity of the livestock raised based on the maximum supportable planting area of the irrigated artificial grasslands and the maximum supportable quantity of the livestock raised in the family pasture;

wherein the converting various grasslands into standard hay by using total digestible nutrients of forage of various grasslands comprises:

$$y_{si} = y_1 \times n_i$$

$$\eta_i = \frac{TDN_i}{TDN_s}$$

wherein $y_{si}$ is a standard hay conversion quantity (kg/hm²) of various grasslands;

16

$y_{si}$ is a forage yield (kg/hm²) of various grasslands;

$n_i$ is a standard hay conversion coefficient;

$TDN_i$ is total digestible nutrients (%) of forage of various grasslands; and $TDN_s$ is total digestible nutrients (%) of temperate steppe forage which is mainly gramineous forage grass.

8. The system according to claim 7, wherein the family pasture available-groundwater-supply equation is:

$$W_S = R \times \beta$$
$$R = 10^3 A \times P \times \alpha_p + \sum_i A_i \times m_i \times \alpha_i$$

wherein $W_s$ is an available-groundwater-supply (m³); $\beta$ is an exploitable coefficient; A is a family pasture land area (km²); P is rainfall (mm); $\alpha_p$ is an infiltration recharge coefficient of rainfall; $A_i$ is an area (hm²) of various grasslands, comprising irrigated artificial grasslands and natural grasslands; $m_i$ is an irrigation quota (m³/hm²) for various grasslands, and the natural grasslands are not irrigated, and have a quota of 0; and $\alpha_i$ is an irrigation infiltration recharge coefficient; and the family pasture water demand quantity equation is:

$$W_R = R \times m_r + A_i \times m_f + L \times m_l$$

wherein $W_R$ is a water demand quantity (m³); R is a quantity of people in the family pasture; $m_r$ is a per capita drinking water quota (m³/person); L is a to-be-determined quantity of livestock raised (in unit of sheep); and $m_l$ is a drinking water quota for livestock (m³/sheep).

9. The system according to claim 8, wherein the water-land balance calculation equation is: $W_S = W_R$.

10. The system according to claim 7, wherein a calculation equation for the total digestible nutrients is:

$$TDN = 81.38 + 0.36\ CP - 0.77\ ADF$$

wherein TDN is the total digestible nutrients (%), comprising $TDN_i$ and $TDN_s$; CP is a content (%) of a crude protein in the forage; and ADF is a content (%) of an acid detergent fiber in the forage.

11. The system according to claim 7, wherein the available-forage-quantity equation is determined by using the following formula:

$$F_S = \sum_i A_i \times y_{si} \times d_i$$

wherein $F_S$ is an available forage quantity (kg); $A_i$ is an area (hm²) of various grasslands; $d_i$ is utilization of artificial forage; $d_j$ is utilization of natural grasslands; and the forage demand quantity equation is:

$$F_R = L \times D$$

wherein $F_R$ is a forage demand quantity (kg); L is a quantity of livestock raised; and D is a forage quota for livestock raising.

12. The system according to claim 11, wherein the forage-livestock balance calculation equation is: $F_S = F_R$.

* * * * *